(12) United States Patent
Eickholt (10) Patent No.: US 7,930,951 B2
(45) Date of Patent: Apr. 26, 2011

(54) RACK AND PINION STEERING GEAR WITH SELF-ADJUSTING RACK BEARING

(75) Inventor: Michael A. Eickholt, New Lothrop, MI (US)

(73) Assignee: Nexteer (Beijing) Technology Co., Ltd.

( * ) Notice: Subject to any disclaimer, the term of this patent is extended or adjusted under 35 U.S.C. 154(b) by 462 days.

(21) Appl. No.: 12/074,940

(22) Filed: Mar. 7, 2008

(65) Prior Publication Data

US 2009/0223314 A1 Sep. 10, 2009

(51) Int. Cl.
*F16H 35/00* (2006.01)
*F16H 1/04* (2006.01)

(52) U.S. Cl. .................... 74/388 PS; 74/422

(58) Field of Classification Search ............ 74/422, 74/388 PS
See application file for complete search history.

(56) References Cited

U.S. PATENT DOCUMENTS

| | | | |
|---|---|---|---|
| 3,585,875 A * | 6/1971 | Adams | 74/392 |
| 3,826,546 A * | 7/1974 | Hay | 384/620 |
| 3,979,968 A | 9/1976 | Ceccherini | |
| 4,095,482 A | 6/1978 | Kirschner | |
| 4,539,857 A | 9/1985 | Kako et al. | |
| 4,593,578 A | 6/1986 | Kobayashi et al. | |
| 4,619,155 A | 10/1986 | Futaba | |
| 4,640,148 A | 2/1987 | Hasegawa | |
| 4,691,583 A | 9/1987 | Taig | |
| 4,709,593 A | 12/1987 | Takeuchi | |
| 4,788,878 A | 12/1988 | Morita et al. | |
| 4,815,329 A | 3/1989 | Ansgar et al. | |
| 5,265,691 A | 11/1993 | Konishi et al. | |
| 5,802,919 A | 9/1998 | Phillips | |
| 6,119,540 A | 9/2000 | Phillips | |
| 6,178,843 B1 | 1/2001 | Machida et al. | |
| 7,654,166 B2 * | 2/2010 | Heo | 74/409 |
| 2003/0074996 A1 | 4/2003 | Camp | |
| 2005/0039560 A1 | 2/2005 | Degorce et al. | |
| 2005/0126328 A1 | 6/2005 | Piotrowski et al. | |
| 2007/0209463 A1 | 9/2007 | Song et al. | |
| 2010/0024583 A1 * | 2/2010 | Kawakubo et al. | 74/422 |

* cited by examiner

*Primary Examiner* — Justin Krause
(74) *Attorney, Agent, or Firm* — Cantor Colburn LLP (57) ABSTRACT

A steering gear assembly with a pinion shaft, rack, housing and rack bearing. A biasing assembly biases the rack bearing against the rack and into engagement with the pinion. The biasing assembly includes a gross adjustment member secured to the housing, a bearing assembly with a bearing member coupled with the rack bearing and a first adjustment member. A first biasing member is coupled with the bearing member and first adjustment member which are relatively moveable to thereby define a compliance zone to allow for dimensional variations in the meshing of the rack and pinion. An adjustment biasing assembly is operably disposed between the gross adjustment member and the bearing assembly. The adjustment biasing assembly is disposed entirely within the housing, includes a second biasing member, and urges the first adjustment member toward the rack bearing in continuously-variable axial movements while preventing movement away from the rack bearing.

13 Claims, 4 Drawing Sheets

RACK AND PINION STEERING GEAR WITH SELF-ADJUSTING RACK BEARING

BACKGROUND OF THE INVENTION

1. Field of the Invention

The present invention relates to rack and pinion steering gear assemblies and rack bearings used therewith.

2. Description of the Related Art

Rack and pinion steering gear assemblies include an intermeshed pinion shaft and rack. A rack bearing is typically positioned to bear against the rack and bias it toward the pinion shaft to maintain the mesh clearance between the pinion shaft and rack. When a rack and pinion steering gear is assembled, the rack bearing is adjusted to provide a desired mesh clearance between the pinion gear and rack. During the initial period of use of the rack and pinion steering gear, typically referred to as the "break-in" period, the rack and pinion gears are subject to a rapid period of wear which can enlarge the mesh clearance between the pinion shaft and rack. The assembly, including the rack bearing, is also subject to wear over the full life of the steering gear. If the mesh clearance between the pinion shaft and rack becomes too large, it can lead to rattle noise and ultimately customer dissatisfaction and complaints. To address the wearing of the pinion shaft, rack and rack bearing and inhibit the development of rattle, a biasing assembly is typically employed to bias the rack bearing into engagement with the rack and various biasing assemblies for use the rack bearing have been developed.

Figure 1:
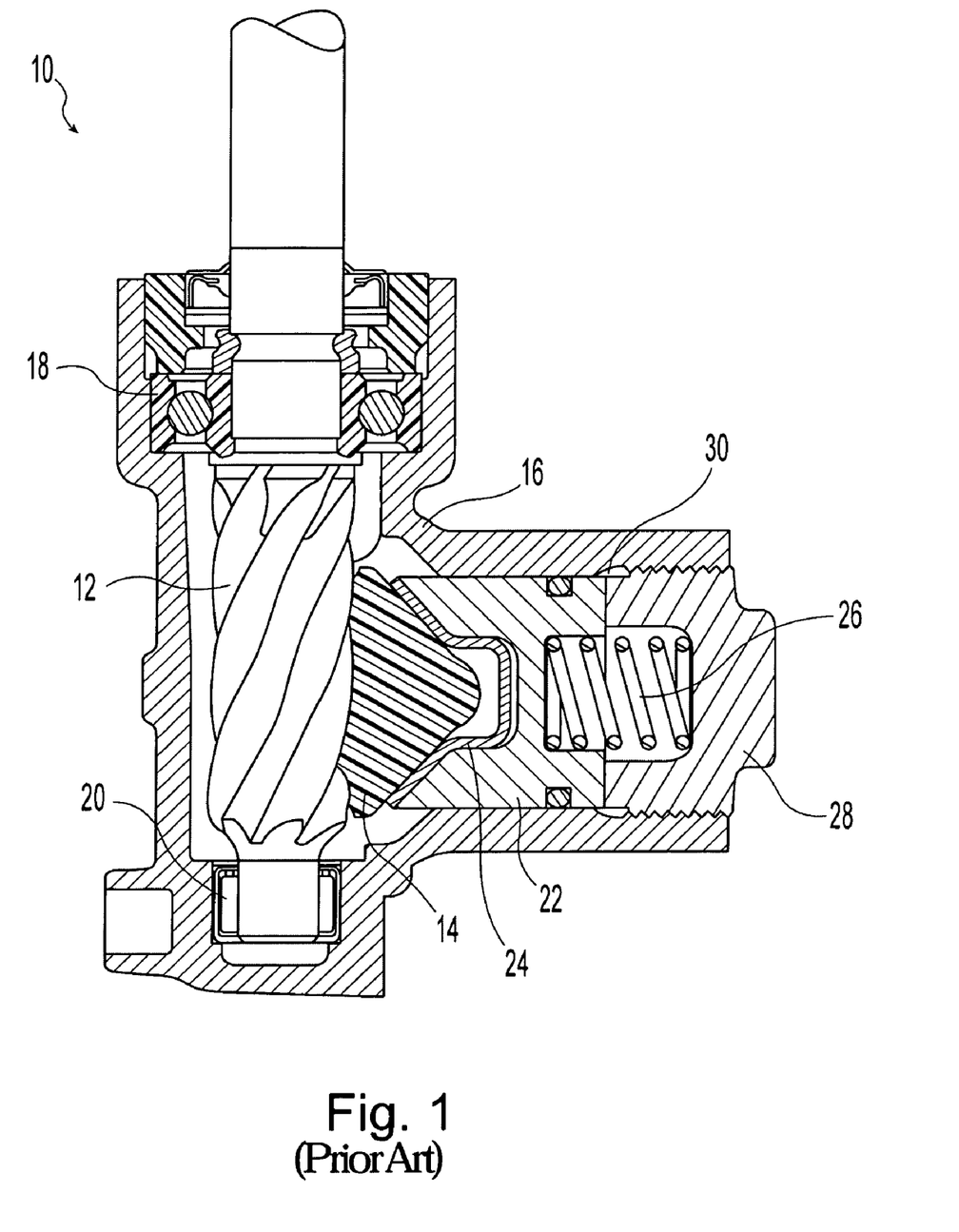
FIG. 1 is a cross-sectional view of a prior art rack and pinion steering gear.

FIG. 1 illustrates a conventional rack and pinion steering gear assembly 10. Steering gear assembly 10 includes a pinion shaft 12 that is intermeshed with rack 14. Pinion 12 and rack 14 are disposed within housing 16. Pinion shaft 12 is rotatably supported within housing 16 on opposite sides of rack 14 by bearings 18 and 20. A rack bearing 22 urges rack 14 into contact with pinion 12. Rack bearing 22 includes a slide lining 24 that is in direct contact with rack 14 and which can be used to reduce the frictional resistance to the relative sliding between rack 14 and rack bearing 22.

A spring 26 exerts a biasing force on rack bearing 22 urging it into contact with rack 14. Spring 26 is engaged with adjustment plug 28 on its end opposite rack bearing 22. A small clearance or compliance zone 30 is typically provided between plug 28 and rack bearing 22 to allow for limited movement of rack bearing 22 toward adjustment plug 28 due to tolerance variations on rack 14 and pinion 12. While zone 30 is often referred to as a clearance zone, because a load is being applied across zone 30 it is more properly referred to as a low load compliance zone. When assembling steering gear 10, adjustment plug 28 is installed to a predefined torque and then retracted a predefined magnitude, e.g., rotated a pre-defined minimal quantity, the pre-defined torque will correspond to a known load on the intermeshed gears of pinion 12 and rack 14 while the retraction of adjustment plug 28 provides for compliance zone 30. As the assembly wears, compliance zone 30 will grow in size and spring 26 will urge rack bearing 22 further away from plug 28 and the force exerted by spring 26 on rack 22 will decrease. As compliance zone 30 grows, the working range of spring 26 also increases and at some point the enlarged size of compliance zone 30 may cause gear rattle.

During initial assembly, if plug 28 is installed at too great a distance from rack 14, the working range of spring 26 will be undesirably large and rattle may result. If plug 28 is inserted to far into housing 16 during the initial assembly, the excessive force exerted by rack bearing 22 on rack 14 would undesirably increase the resistance to steering efforts exerted by the driver of the vehicle.

Another example of a biasing assembly for a rack bearing is disclosed by Piotrowski et al. in U.S. Pat. Pub. No. 2005/0126328 A1 entitled RACK AND PINION STEERING GEAR ADJUSTER CLEARANCE ENHANCEMENT, the disclosure of which is hereby incorporated herein.

An improved steering gear assembly that inhibits the development of rattle as the rack and pinion are subjected to wear, is desirable.

SUMMARY OF THE INVENTION

The present invention provides a rack and pinion steering gear with a self-adjusting rack bearing.

The invention comprises, in one form thereof, a rack and pinion steering gear assembly that includes a housing forming a housing interior, a pinion shaft, and a rack operably engaged with the pinion shaft wherein the shaft and the rack are at least partially disposed within the housing interior. A rack bearing is engaged with the rack and disposed opposite the pinion shaft. A biasing assembly is operably coupled with the rack bearing and biases the rack bearing into engagement with the rack along a biasing axis whereby the rack bearing urges the rack into engagement with the pinion shaft. The biasing assembly includes a gross adjustment member, a bearing assembly and an accumulative adjustment assembly. The gross adjustment member is securable to the housing at a plurality of axial positions relative to the biasing axis and is fixed to the housing at a selected one of the positions during initial assembly of the steering gear assembly. The bearing assembly includes a bearing member, a first adjustment member and a first biasing member. The bearing member is bearingly coupled with the rack bearing and the first adjustment member is relatively moveably coupled with the bearing member wherein relative movement along the biasing axis between the first adjustment member and the bearing member defines a compliance zone. The compliance zone allows the bearing member to move in response to dimensional variations in the pinion shaft and the rack during operation of the steering gear assembly. The first biasing member biases the bearing member along the biasing axis away from the first adjustment member and toward the rack bearing. The accumulative adjustment assembly is operably disposed between the gross adjustment member and the first adjustment member and is disposed entirely within the housing interior. The accumulative adjustment assembly has a second biasing member that is operably coupled with the first adjustment member and urges the first adjustment member toward the rack bearing along the biasing axis. The second biasing member exerts an effective axial force that is insufficient to compress the compliance zone. The first adjustment member is operably coupled with the biasing assembly such that the first adjustment member is relatively moveable toward the rack bearing in continuously-variable axial movements and axial movement of the first adjustment member away from the rack bearing is prevented.

The invention comprises, in another form thereof, a rack and pinion steering gear assembly that includes a housing forming a housing interior, a pinion shaft, and a rack operably engaged with the pinion shaft wherein the shaft and the rack are at least partially disposed within the housing interior. A rack bearing is engaged with the rack and disposed opposite the pinion shaft. A biasing assembly is operably coupled with the rack bearing and biases the rack bearing into engagement with the rack along a biasing axis whereby the rack bearing urges the rack into engagement with the pinion shaft. The biasing assembly includes a gross adjustment member, a bearing assembly and an accumulative adjustment assembly. The gross adjustment member is securable to the housing at a plurality of axial positions relative to the biasing axis and is fixed to the housing at a selected one of the positions during initial assembly of the steering gear assembly. The bearing assembly includes a bearing member, a first adjustment member and a first biasing member. The bearing member is bearingly coupled with the rack bearing and the first adjustment member is relatively moveably coupled with the bearing member such that relative movement along the biasing axis between the first adjustment member and the bearing member defines a compliance zone. The compliance zone allows the bearing member to move in response to dimensional variations in the pinion shaft and the rack during operation of the steering gear assembly. The first biasing member biases the bearing member along the biasing axis away from the first adjustment member and toward the rack bearing. The accumulative adjustment assembly is operably disposed between the gross adjustment member and the first adjustment member and is disposed entirely within the housing interior. The accumulative adjustment assembly has a second biasing member and a second adjustment member. The second biasing member urges the second adjustment member to rotate about the biasing axis in a first rotational direction relative to the gross adjustment member. Rotation of the second adjustment member in the first rotational direction urges the first adjustment member toward the rack bearing along the biasing axis. The second biasing member exerts an effective axial force insufficient to compress the compliance zone. The operable coupling of the second adjustment member with the first adjustment member allows relative movement of the first adjustment member toward the rack bearing in continuously-variable axial movements and inhibits axial movement of the first adjustment member away from the rack bearing.

The invention comprises, in still another form thereof, a method of assembling a rack and pinion steering gear assembly. The method includes providing a housing forming a housing interior, operably engaging a rack with a pinion shaft wherein the rack and the pinion shaft are each at least partially disposed within the housing, and engaging a rack bearing with the rack wherein the rack bearing is disposed opposite the pinion shaft. The method also includes operably coupling a biasing assembly with the rack bearing to thereby bias the rack bearing into engagement with the rack along a biasing axis whereby the rack bearing urges the rack into engagement with the pinion shaft. Operably coupling the biasing assembly with the rack bearing further includes relatively moveably coupling a bearing member to a first adjustment member, operably coupling a first biasing member with the bearing member and the first adjustment member and bearingly coupling the bearing member with the rack bearing wherein relative movement along the biasing axis between the first adjustment member and the bearing member defines a compliance zone. The compliance zone allows the bearing member to move in response to dimensional variations in the pinion shaft and the rack during operation of the steering gear assembly. The first biasing member biases the bearing member along the biasing axis away from the first adjustment member and toward the rack bearing. An accumulative biasing assembly is operably coupled with the first adjustment member wherein the accumulative adjustment assembly is operably positioned between the first adjustment member and a gross adjustment member that is fixable to the housing at a plurality of axial positions relative to the biasing axis. The accumulative adjustment assembly has a second biasing member that is operably coupled with the first adjustment member and urges the first adjustment member toward the rack bearing along the biasing axis. The second biasing member exerts an effective axial force insufficient to compress the compliance zone. The first adjustment member is operably coupled with the biasing assembly wherein the first adjustment member is relatively moveable toward the rack bearing in continuously-variable axial movements and axial movement of the first adjustment member away from the rack bearing is inhibited. The method also includes sealing the entire accumulative adjustment assembly within the housing interior and fixing the gross adjustment member to the housing at a selected axial position.

In some embodiments of the method, the step of relatively moveably coupling the bearing member to the first adjustment member includes operably coupling a threaded member with one of the bearing member and the first adjustment member and threadingly engaging the threaded fastener with the other of the bearing member and first adjustment member. The threaded member is adjusted to form the compliance zone with a predefined axial magnitude. In this embodiment of the method, a second adjustment member is provided wherein the second biasing member is operably disposed between the gross adjustment member and the second adjustment member and urges the second adjustment member to rotate about the biasing axis in a first rotational direction. Movement of the second adjustment member in the first rotational direction urges the first adjustment member toward the rack bearing. The step of operably coupling the adjustment biasing assembly with the first adjustment member includes securing the second adjustment member relative to the gross adjustment member during installation. The securing of the second adjustment member prevents the second biasing member from exerting a force on the first adjustment member. The second adjustment member is released to move relative to the gross adjustment member after the gross adjustment member has been fixed to the housing in the selected axial position. Lastly, in this embodiment of the method, the step of fixing the gross adjustment member to the housing includes threadingly engaging the gross adjustment member to the housing and installing the gross adjustment member at an axial position selected as a function of a pre-defined torque with the second adjustment member remaining secured relative to the gross adjustment member during installation of the gross adjustment member.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the exemplification set out herein illustrates embodiments of the invention, in multiple forms, the embodiments disclosed below are not intended to be exhaustive or to be construed as limiting the scope of the invention to the precise forms disclosed.

DETAILED DESCRIPTION OF THE INVENTION

Figures 2, 3:
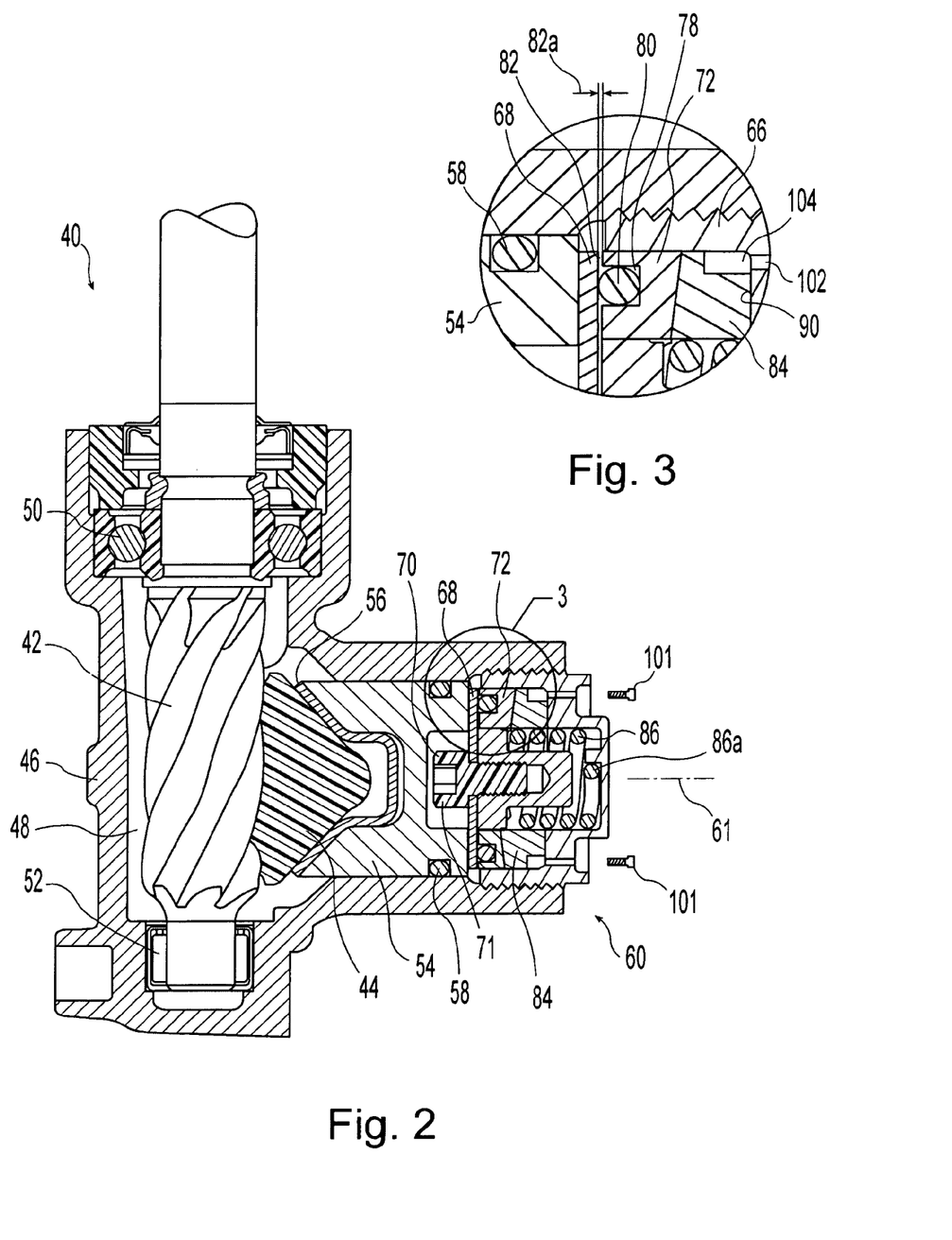
FIG. 2 is a cross-sectional view of a steering gear in accordance with the present invention.
FIG. 3 is an enlarged view of the compliance zone of the steering gear assembly of FIG. 2.
Figure 4:
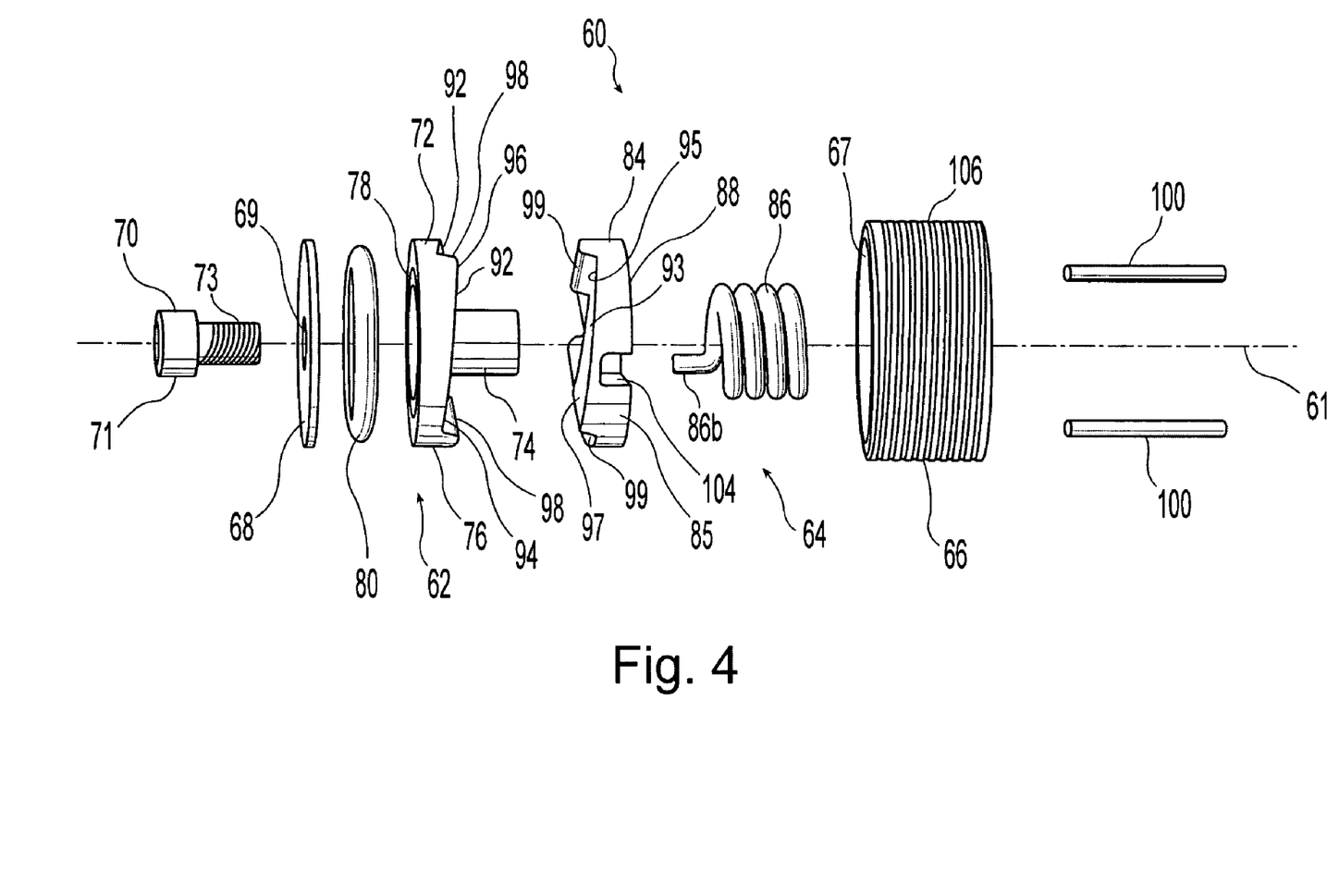
FIG. 4 is an exploded perpsective view of the biasing assembly of the steering gear assembly of FIG. 2.

One embodiment of a rack and pinion steering gear assembly 40 in accordance with the present invention is illustrated in FIGS. 2-4. Steering gear assembly 40 includes a conventional pinion shaft 42 that is intermeshed with a conventional rack 44. A housing 46 forms a housing interior 48 and both the rack 44 and pinion shaft 42 are partially disposed within housing interior 48. Pinion shaft 42 is rotatably supported in housing 46 on opposite sides of rack 44 by bearings 50, 52. A rack bearing 54 is engaged with rack 44 and disposed opposite pinion shaft 42. Rack bearing 54 includes a slide lining 56 that is in direct contact with rack 44 and is used to reduce the frictional resistance to the relative sliding between rack 44 and rack bearing 54. An example of a multi-layered slide lining is disclosed by Degorce et al. in U.S. Pat. Pub. No. 2005/0039560 A1 entitled RACK THRUSTER COMPRISING SLIDE LINING MADE OF MULTI-LAYERED MATERIAL, the disclosure of which is hereby incorporated herein. An O-ring is disposed in an annular groove on rack bearing 54 and forms a seal between rack bearing 54 and housing 46 and limits the migration of lubricants on pinion shaft 42 and rack 44. This O-ring also prevents rattle that may result from rack bearing 54 moving in a transverse direction to axis 61. It should be noted that such transverse rack bearing rattle is distinct from rack and pinion mesh rattle.

A biasing assembly 60 urges rack bearing 54 into engagement with rack 44 along biasing axis 61 and thereby urges rack 44 into engagement with pinion shaft 42. Biasing assembly 60 is shown in an exploded view in FIG. 4 and includes a bearing assembly 62, an accumulative adjustment assembly 64 and a gross adjustment member 66.

Biasing assembly 60 includes a bearing member 68 that bearingly engages the rear of rack bearing 54 to bias rack bearing 54 toward rack 44. In the illustrated embodiment, bearing member 68 is a plate that directly engages rack bearing 54. An intermediate part or differently configured bearing member could be employed in alternative embodiments when conveying bearing forces to rack bearing 54. Bearing member 68 has a central opening 69 through which a threaded fastener 70 extends to relatively moveably secure bearing member 68 to first adjustment member 72. Central opening 69 in bearing member 68 is sufficiently large to allow bearing member 68 to move along shaft 73 of fastener 72. Head 71 of fastener 72, however, is larger than central opening 69 in bearing member 68 and limits the movement of bearing member 68. Various other alternative configurations may also be used to provide for the adjustable and relatively moveable coupling of bearing member 68 with first adjustment member 72.

First adjustment member 72 includes an inner portion 74 with a threaded bore for receiving threaded shaft 73 of fastener 70. Inner portion 74 is fixed to an outer radial portion 76. In the illustrated embodiment, inner portion 74 and outer radial portion 76 are separately formed, such as by metal casting and machining and then fixed together using welds or other suitable means. In alternative embodiments, first adjustment member 72 could be formed out of a single integral part. Outer portion 76 of member 72 has an annular groove 78 on one side therof. A biasing member 80, which takes the form of an O-ring in the illustrated embodiment, is seated in annular groove 78 and projects outwardly therefrom. As best seen in FIG. 3, bearing member 68 is engaged with O-ring 80 and is spaced from first adjustment member 72 by O-ring 80. O-ring 80 is not used to provide a seal but instead provides a biasing member and biases bearing member 68 away from first adjustment member 72 along axis 61 towards rack bearing 54.

Threaded fastener 70 is installed to allow bearing member 68 to move back and forth along axis 61 through a compliance zone 82. The axial magnitude 82a of compliance zone 82 is selected to allow bearing plate 68 to move away from pinion shaft 42 along axis 61 for a limited distance to thereby account for dimensional variations in pinion shaft 42 and rack 44. The travel of bearing plate 68 along axis 61, i.e., travel through compliance zone 82, is limited by head 71 of fastener 70 in the direction toward rack bearing 54 and by engagement with first adjustment member 72 in the opposite direction away from rack bearing 54. The magnitude 82a of compliance zone 82 together with the properties of O-ring 80 and depth of groove 78 determine the axial biasing force that is exerted by biasing member 80 urging bearing plate 68 toward rack bearing 54 in its installed condition. Although an O-ring is used to provide biasing member 80 in the illustrated embodiment, a spring or other suitable biasing member could be adapted for positioning between bearing plate 68 and first adjustment member 72 in alternative embodiments. In still other embodiments, a threaded shaft could extend from first adjustment member 72 through opening 69 in bearing plate 68 with a threaded nut located on the projecting shaft limiting the axial travel of bearing plate 68.

Accumulative adjustment assembly 64 is operably disposed between gross adjustment member 66 and first adjustment member 72 and is located entirely within housing interior 48. While compliance zone 82 allows rack bearing 54 to move axially away from pinion shaft 42 to account for dimensional variances or manufacturing deviations in pinion shaft 42, rack 44, and slide lining 56, accumulative adjustment assembly 64 and its interaction with first adjustment member 72 provides axial adjustments that account for the wearing of pinion shaft 42 and rack 44 over time and progressively bias first adjustment member 72 along axis 61 toward pinion shaft 42 as such wear occurs.

Accumulative adjustment assembly 64 includes a second adjustment member 84 and a biasing member 86 which takes the form of a torsional spring in the illustrated embodiment. Torsional spring 86 is schematically depicted in the figures and has one end 86a secured to gross adjustment member 66 and its opposite end secured to second adjustment member 84. Gross adjustment member 66 defines a generally cylindrical interior 67 in which second adjustment member 84 and torsional spring 86 are located. In the embodiment of FIGS. 2-4, radially inwardly facing surfaces of gross adjustment member 66 forming interior 67 are substantially smooth-walled surfaces as opposed to threaded surfaces. Second adjustment member 84 has a substantially circular outer perimeter 85 and is rotatable within gross adjustment member 66 about axis 61. On one side, second adjustment member 84 has a substantially planar surface 88 that is seated on shoulder 90 of gross adjustment member 66. Torsional spring 86 exerts a biasing force that urges second adjustment member 84 to rotate about axis 61 within and relative to gross adjustment member 66 in a first rotational direction.

Torsional spring 86 is operably coupled with first adjustment member 72 and biases first adjustment member 72 towards rack bearing 54 along axis 61 through the interaction of camming surfaces located on first and second adjustment members 72, 84. As best understood with reference to FIG. 4, first adjustment member 72 has three camming surfaces 92 which extend through a rotational arc of approximately 120 degrees about axis 61 from a leading edge 94 to a trailing edge 96. The camming surfaces 92 are axially inclined and an axially extending step surface 98 extends between each pair of adjacent leading and trailing edges 94, 96. Second adjustment member 84 has a corresponding set of camming surfaces 93 which also each extend through a rotational arc of approximately 120 degrees about axis 61 from leading edges 95 to trailing edges 97 with step surfaces 99 axially extending between each pair of adjacent leading and trailing edges 95, 97. Each of the individual camming surfaces 92, 93 form a short length of a helical surface. Alternative camming surface configurations may also be employed, for example, non-helical wedge shaped camming surfaces could be positioned within gross adjustment member 66 to bias the first adjustment member toward rack bearing 54.

When steering gear 40 is initially assembled, first and second adjustment members 72, 84 are positioned with camming surfaces 92, 93 being mutually engaged and nested together such that leading edges 94 on camming surfaces 92 are positioned near trailing edges 97 and trailing edges 96 are positioned near leading edges 95. This nested arrangement minimizes the axial extent of first and second adjustment members 72, 84. In other words, in this nested arrangement, first adjustment member 72 is positioned relatively close to shoulder 90 within gross adjustment member 66. When second adjustment member 84 rotates in the direction urged by torsional spring 86, second adjustment member 84 will rotate relative to both gross adjustment member 66 and first adjustment member 72 causing camming surfaces 92, 93 to slide relative to each other. Due to the inclination of camming surfaces 92, 93 from their respective leading edges 94, 95 to their respective trailing edges 96, 97, as camming surfaces 92, 93 slide relative to each other first adjustment member 72 will be biased away from shoulder 90 and toward rack bearing 54.

After steering gear 40 is put into operation and pinion shaft 42 and rack 44 begin to wear, first adjustment member 72 will need to be repositioned toward pinion shaft 42 for bearing plate 68 to exert the same bearing force on rack bearing 54. As this wear occurs, the resistance to the rotational movement of second adjustment member 84 relative to both gross adjustment member 66 and first adjustment member 72 will decrease until the biasing force of torsional spring 86 is sufficient to rotate second adjustment member 84 and thereby bias first adjustment member 72 towards pinion shaft 42. In this manner, biasing assembly 60 provides a self-adjusting system that urges first adjustment member 72 in a direction towards rack bearing 54 along axis 61 as pinion shaft 42 and rack 44 experience wear.

The continuous slope of camming surfaces 92, 93 results in self-adjusting continuously-variable axial movements of first adjustment member 72. In other words, the self-adjusting movements of first adjustment member 72 along axis 61 do not take place in discrete steps of pre-defined magnitude but are incremental movements that can occur in variable magnitudes, e.g., a magnitude less than, equal to, or greater than compliance zone 82. The effective axial biasing force that torsional spring 86 exerts on first adjustment member 72 through second adjustment member 84 and camming surfaces 92, 93 is insufficient to compress the compliance zone 82. If the effective axial biasing force of torsional spring 86 were sufficient to compress compliance zone 82 such that bearing member 68 engaged first adjustment member 72, compliance zone 82 would remain compressed and would not be available to allow for the axial movement of bearing member 68 in response to dimensional variations in pinion shaft 42 and rack 44. Because the effective axial biasing force of spring 86 is insufficient to compress compliance zone 82, rotation of second adjustment member 84 and axial advancement of first adjustment member 72 will only occur when bearing plate 68 is at its most distant location from first adjustment member 72 and engaged with fastener head 71. This ensures that compliance zone 82 will remain available to account for dimensional variations as first adjustment member 72 progresses toward pinion shaft 42 due to wear of pinion shaft 42 and rack 44.

Frictional resistance to relative rotation of second adjustment member 84 together with the biasing force of torsional spring 86 will prevent first adjustment member 72 from moving axially towards shoulder 90 and away from pinion shaft 42 as it progresses toward pinion shaft 42 due to wear. In this regard, it is noted that bearing pressure exerted through biasing assembly 60 along axis 61 between gross adjustment member 66 and rack bearing 54 will be at a relative minimum when torsional spring 86 is rotating second adjustment member 84 and at a relative maximum when dimensional variations in pinion shaft 42 and rack 44 are compressing biasing member 80 and compliance zone 82. Correspondingly, the frictional resistance to sliding between camming surfaces 92, 93 will be at a minimum when the bearing pressure exerted through biasing assembly 60 along axis 61 is at a minimum and this frictional resistance will be at a maximum when this bearing pressure is at a maximum.

Alignment pins 100 are shown in FIG. 4 and are used in the assembly of steering gear 40. During assembly, torsion spring 86 has its opposite ends secured to gross adjustment member 66 and second adjustment member 84. When second adjustment member 84 is properly positioned within gross adjustment member 66, spring 86 urges the relative rotation of second adjustment member 84 and gross adjustment member 66. Pins 100 are used to maintain second adjustment member 84 stationary relative to gross adjustment member 66 during assembly and maintain torsion spring 86 in its properly torqued condition. Gross adjustment member 66 includes bore holes 102 (FIG. 2) through which pins 100 are inserted. Pins 100 extend through bores 102 and into notches which form an alignment feature 104 on second adjustment member 84. (To provide greater flexibility when pre-loading torsion spring 86, notches 84 could be provided at closely spaced intervals about the full outer circumference of second adjustment member 84.) The engagement of pins 100 with notches 104 resists the biasing force exerted by spring 86 such that spring 86 does not exert an axial biasing force on first adjustment member 72 during assembly.

When assembling biasing assembly 60, fastener 70 is installed to define a compliance zone 82 of the desired magnitude 82*a* and spring 86 is properly torqued and second adjustment member 84 is held in place with pins 100. First and second adjustment members 72 and 84 are engaged and then gross adjustment member 66 is engaged with housing 46. Gross adjustment member 66 has a helically threaded radially exterior surface 106 that mates with threads formed in housing 46. Gross adjustment member 66 is threadingly engaged with housing 46 and rotated into position. As gross adjustment member 66 is rotated into position, biasing assembly 62 and accumulative adjustment assembly 64 rotate together with gross adjustment member 66. In this regard, it is noted that pins 100 prevent the rotation of second adjustment member 84 and engagement of step surfaces 98, 99 will limit any rotation of biasing assembly 62 relative to gross adjustment member 66.

Gross adjustment member 66 can be positioned at various axial positions along axis 61 and to position gross adjustment member 66 at the axial position where biasing assembly 60 will exert the desired bearing force on rack bearing 54, gross adjustment member 66 is tightened to a pre-defined torque that corresponds to the desired bearing force. By selecting a pre-defined torque that results in a bearing force on rack bearing 54 that is less than the axial force required to compress compliance zone 82, compliance zone 82 will be effective prior to an initial wearing of pinion 42 and rack 44. Because compliance zone 82 is defined by bearing assembly 62, after rotating gross adjustment member 66 to the pre-defined torque, gross adjustment member 66 does not have to be retracted by rotating it in a reverse direction through a small predefined rotational angle to thereby form a compliance zone. In some embodiments of the present invention, however, it may be desirable to retract or advance gross adjustment member 66 through a predefined rotational range after installing gross adjustment member 66 to a predefined torque. Whether the final installed axial position of gross adjustment member 66 is at the precise location where the predefined torque was reached or at a predefined axial distance from that predefined torque location, in both cases, the final installed axial position of gross adjustment member 66 will have been selected as a function of a predefined torque.

Once gross adjustment member 66 has been positioned in the desired axial location, pins 100 are removed and bore holes 102 are sealed. Threaded fasteners 101 are depicted in FIG. 2 and are used for sealing bore holes 102 after the removal of alignment pins 100. In the illustrated embodiment, bore holes 102 are provided with internal threads for mating with fasteners 101.

An adhesive can be used to both secure and seal external threads 106 of gross adjustment member 66 with threads on housing 46 to secure gross adjustment member 66 in its installation position and to prevent entry of contaminants into housing interior 48. Similarly, an adhesive can be applied to threads on fasteners 101 prior to installing fasteners in bores 102 to thereby seal bores 102. Such threadlocking and sealing adhesives are commercially available and well-known to a person having ordinary skill in the art. For example, such adhesives are available from the Henkel Corporation under the Loctite® brand name. By having the accumulative adjustment assembly 62 located entirely within housing interior 48 and sealing the housing interior against the ingress of contaminants, both the corrosion of accumulative adjustment assembly 62 and interfering agglomeration of particles about accumulative adjustment assembly 62 can be inhibited. In this regard, it is noted that where housing 46 defines an opening the limits of the housing interior may be defined by a separate component closing that opening. Thus, the limits of housing interior 48 are at least partially defined by gross adjustment member 66 in the embodiment illustrated in FIGS. 2-4 with the cylindrical interior 67 of gross adjustment member 66 forming a portion of housing interior 48.

The use of three separately adjustable pre-loaded forces to provide (a) a compliance zone 82 (through the pre-loading of biasing member 80 when installing fastener 70); (b) an accumulative adjustment assembly 62 (wherein biasing member 86 is held in place with alignment pins 100 after being pre-loaded to a pre-defined magnitude), and (c) a gross adjustment member 66 which is installed to a predefined torque to apply a initial biasing force on rack bearing 54; facilitates the assembly of steering gear 40 and the proper calibration of the biasing forces exerted by these three features.

Figure 5:
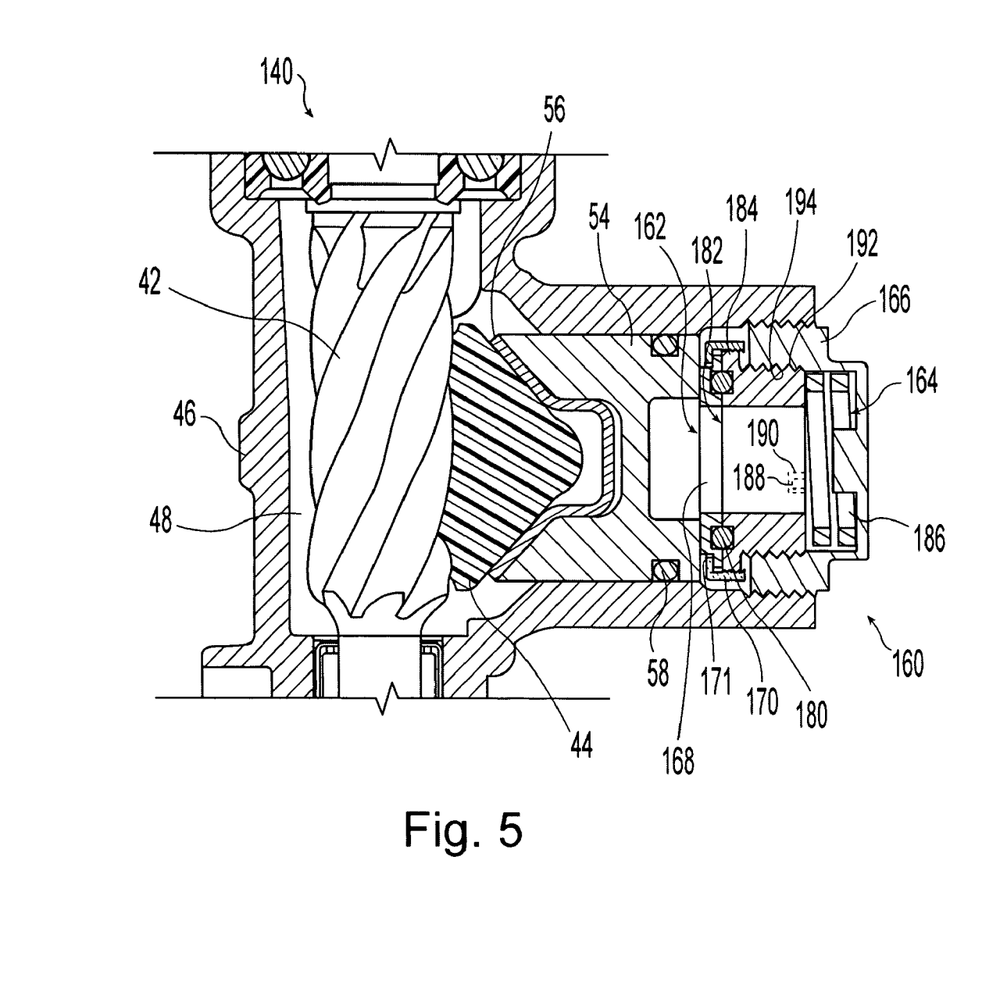
FIG. 5 is a cross-sectional view of an alternative embodiment.
Figure 6:
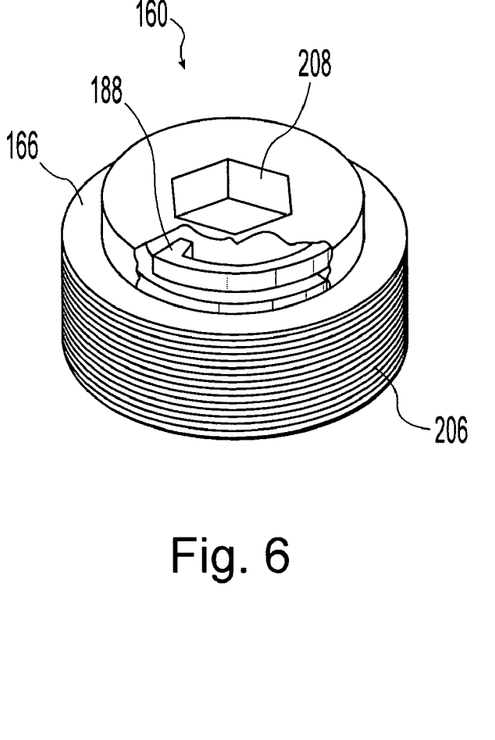
FIG. 6 is a partially broken away perspective view of the biasing assembly of the steering gear assembly of FIG. 5.

Alternative embodiment 140 of a rack and pinion steering gear assembly in accordance with the present invention is illustrated in FIGS. 5 and 6. The pinion shaft 42, rack 44, housing 46 and rack bearing 54 are similar to those employed in steering gear 40, however, biasing assembly 160 does differ from biasing assembly 60 in several aspects which are described in greater detail below. Biasing assembly 160 includes a bearing assembly 162 engaged with rack bearing 54 and exerting a bearing force thereon, an accumulative adjustment assembly 164 to account for the wear of pinion shaft 42 and rack 44 and a gross adjustment member 166.

As illustrated in FIG. 5, bearing assembly 162 includes a bearing member 168 that is engaged with rack bearing 54, an adjustment member 184 and a biasing member 180 located between bearing member 168 and adjustment member 184. Bearing member 168 and adjustment member 184 each include an annular groove in which biasing member 180 is disposed. In the illustrated embodiment biasing member 180 takes the form of an O-ring. In alternative embodiments, however, other biasing members may be employed to operably couple bearing member 168 and adjustment member 184. Although FIG. 5 is not represented at the same scale as FIG. 3, biasing member 180 forms a compliance zone 182 between bearing member 168 and adjustment member 184 that functions in the same manner as compliance zone 82 in steering gear 40 to allow rack bearing 54 to move away from pinion shaft 42 to account for manufacturing deviations in pinion shaft 42 and rack 44.

In the embodiment of FIG. 5 and 6, an annular ring 170 with a radially inwardly projecting flange 171 is used to relatively moveably couple bearing member 168 with adjustment member 184. Annular ring 170 includes threads on its radially inward surface which mate with threads on the outer radial surface of adjustment member 184 to thereby attach annular ring 170 to adjustment member 184 in a manner that is easily and conveniently adjustable. Radially inwardly projecting flange 171 extends about the full circumference of ring 170 and overlays a radially outwardly projecting lip on bearing member 168 to thereby relatively moveably capture bearing member 168. An adhesive, welding or other means may be advantageously employed to fix ring 170 in its selected position on adjustment member 184. Various alternative methods of relatively moveably coupling bearing member 168 with adjustment member 184 may also be employed. For example, simply capturing bearing member 168 between rack bearing 54 and adjustment member 184 by the installation of gross adjustment member 166 would relatively moveably couple bearing member 168 with adjustment member 184.

Adjustment member 184 has a generally hollow cylindrical shape with helical threads 192 located on its radially outer surface. Helical threads 192 are engaged with corresponding helical threads 194 located on the radially internal surface of gross adjustment member 166. As will be readily understood by a person having ordinary skill in the art, rotation of adjustment member 184 relative to gross adjustment member 166 will axially reposition adjustment member 184 relative to gross adjustment member 166 due to the interaction of mutually engaged helical threads 192, 194 which thereby act as first and second camming surfaces. Threads 192, 194 have a configuration that is similar to conventional threads and extend through a rotational range that is greater than 360 degrees. In the illustrated embodiment, threads 192, 194 extend through a rotational range of many multiples of 360 degrees.

Accumulative adjustment assembly 164 includes a biasing member 186 which takes the form of a torsion spring. Torsion spring 186 is operably disposed between gross adjustment member 166 and adjustment member 184 and urges the relative rotation of adjustment member 184 in a rotational direction that results in adjustment member 184 moving axially toward pinion shaft 42. Unlike biasing assembly 60 with its first and second adjustment members 72, 84; biasing assembly 160 has a single adjustment member 184. Similar to biasing assembly 60, the rotational biasing force exerted by torsional spring 186 on adjustment member 184 exerts an effective axial force on adjustment member 184 that is insufficient to compress compliance zone 182. Additionally, when rack bearing 54 is exerting a force that does compress compliance zone 182, the axial load that is imparted will increase the frictional resistance to relative rotation between threads 192 and 194 and such threads will prevent adjustment member 184 from moving in an axial direction away from pinion shaft 42. Torsion spring 186 has hooked ends 188 at its opposite ends and is mechanically engaged with adjustment member 184 by the insertion of one hooked end 188 in a recess 190 (FIG. 5). As schematically depicted in FIG. 6, the other hooked end 188 of torsion spring 186 is engaged with gross adjustment member 166, e.g., by insertion into a recess. Various other methods, e.g., welding or adhesives, may also be employed to engage torsion spring 186 with adjustment member 184 and gross adjustment member 166.

The continuous slope of threads 192, 194 results in self-adjusting continuously-variable axial movements of adjustment member 184. In other words, the self-adjusting movements of adjustment member 184 along the biasing axis do not take place in discrete steps of pre-defined magnitude but are incremental movements that can occur in variable magnitudes, e.g., a magnitude less than, equal to, or greater than compliance zone 182.

Gross adjustment member 166 includes external helical threads 206 for securing gross adjustment member 166 to housing 46. As best seen in FIG. 6, a socket 208 is formed on gross adjustment member 266 for engagement by an appropriate tool when rotatably installing gross adjustment member 266. Gross adjustment member 266 can be positioned at various axial locations on housing 46 and is installed to a selected axial position by rotating it to a pre-defined torque which corresponds to a pre-defined load being applied to rack bearing 54. A thread adhesive is advantageously used to secure gross adjustment member 166 in its installed position and inhibit the ingress of contaminants into the interior of housing 46.

While this invention has been described as having an exemplary design, the present invention may be further modified within the spirit and scope of this disclosure. This application is therefore intended to cover any variations, uses, or adaptations of the invention using its general principles.

What is claimed is:

1. A rack and pinion steering gear assembly, said assembly comprising:
    a pinion shaft;
    a rack operably engaged with said pinion shaft;
    a housing forming a housing interior, said pinion shaft and said rack being at least partially disposed within said housing interior;
    a rack bearing, said rack bearing engaged with said rack and disposed opposite said pinion shaft;
    a biasing assembly operably coupled with said rack bearing and biasing said rack bearing into engagement with said rack along a biasing axis whereby said rack bearing urges said rack into engagement with said pinion shaft; and
    wherein said biasing assembly comprises:
    a gross adjustment member securable to said housing at a plurality of axial positions relative to said biasing axis, said gross adjustment member being fixed to said housing at a selected one of said positions during initial assembly of said steering gear assembly;
    a bearing assembly, said bearing assembly including a bearing member, a first adjustment member and a first biasing member; said bearing member being bearingly coupled with said rack bearing, said first adjustment member being relatively moveably coupled with said bearing member wherein relative movement along said biasing axis between said first adjustment member and said bearing member defines a compliance zone; said compliance zone allowing said bearing member to move in response to dimensional variations in said pinion shaft and said rack during operation of said steering gear assembly; said first biasing member biasing said bearing member along said biasing axis away from said first adjustment member and toward said rack bearing; and
    an accumulative adjustment assembly operably disposed between said gross adjustment member and said first adjustment member and disposed entirely within said housing interior; said accumulative adjustment assembly having a second biasing member wherein said second biasing member is operably coupled with said first adjustment member and urges said first adjustment member toward said rack bearing along said biasing axis, said second biasing member exerting an effective axial force insufficient to compress said compliance zone; and wherein said first adjustment member is operably coupled with said biasing assembly wherein said first adjustment member is relatively moveable toward said rack bearing in continuously-variable axial movements and axial movement of said first adjustment member away from said rack bearing is inhibited; and said gross adjustment member being threadingly engaged with said housing to thereby fix said gross adjustment member to said housing, and said accumulative adjustment assembly are rotated together with said gross adjustment member as said gross adjustment member is threadingly engaged with said housing, and a threaded member relatively moveably securing said bearing member to said first adjustment member wherein installation of said threaded fastener defines an axial magnitude of said compliance zone.

2. The rack and pinion steering gear assembly of claim 1 wherein said first adjustment member has first and second camming surfaces.

3. The rack and pinion steering gear assembly of claim 2 wherein said first and second camming surfaces define helically oriented surfaces and said second biasing member urges rotation of at least one of said first and second camming surfaces about said biasing axis.

4. The rack and pinion steering gear assembly of claim 3 further comprising a second adjustment member operably disposed between said second biasing member and said first adjustment member, said second camming surface being disposed on said second adjustment member and wherein said gross adjustment member defines at least one alignment opening and said second adjustment member includes at least one alignment feature.

5. The rack and pinion steering gear assembly of claim 3 wherein each of said first and second camming surfaces extend through a rotational angle of no more than 360 degrees.

6. The rack and pinion steering gear assembly of claim 1 further comprising a second adjustment member operably disposed between said second biasing member and said first adjustment member, said second adjustment member being engaged with said first adjustment member wherein said second biasing member urges movement of said second adjustment member relative to said gross adjustment member in a first direction and movement of said second adjustment member in said first direction urges said first adjustment member toward said rack bearing;

wherein said second adjustment member defines an alignment feature engageable with an alignment member to secure said second adjustment member to said gross adjustment member during installation of said gross adjustment member, said alignment member being disengageable from said alignment feature to allow for relative movement of said second adjustment member and said gross adjustment member after said gross adjustment member has been fixed to said housing;

said accumulative adjustment assembly is entirely sealingly disposed within said housing interior; and said gross adjustment member is fixed to said housing at an axial position selected as a function of a pre-defined torque applied to said gross adjustment member.

7. A rack and pinion steering gear assembly, said assembly comprising:

a pinion shaft;
a rack operably engaged with said pinion shaft;
a housing forming a housing interior, said pinion shaft and said rack being at least partially disposed within said housing interior;
a rack bearing, said rack bearing engaged with said rack and disposed opposite said pinion shaft;
a biasing assembly operably coupled with said rack bearing and biasing said rack bearing into engagement with said rack along a biasing axis whereby said rack bearing urges said rack into engagement with said pinion shaft; and wherein said biasing assembly comprises:
a gross adjustment member securable to said housing at a plurality of axial positions relative to said biasing axis, said gross adjustment member being fixed to said housing at a selected one of said positions during initial assembly of said steering gear assembly;
a bearing assembly, said bearing assembly including a bearing member, a first adjustment member and a first biasing member; said bearing member being bearingly coupled with said rack bearing, said first adjustment member being relatively moveably coupled with said bearing member wherein relative movement along said biasing axis between said first adjustment member and said bearing member defines a compliance zone; said compliance zone allowing said bearing member to move in response to dimensional variations in said pinion shaft and said rack during operation of said steering gear assembly; said first biasing member biasing said bearing member along said biasing axis away from said first adjustment member and toward said rack bearing; and
an accumulative adjustment assembly operably disposed between said gross adjustment member and said first adjustment member and disposed entirely within said housing interior; said accumulative adjustment assembly having a second biasing member and a second adjustment member wherein said second biasing member urges said second adjustment member to rotate about said biasing axis in a first rotational direction relative to said gross adjustment member; rotation of said second adjustment member in said first rotational direction urging said first adjustment member toward said rack bearing along said biasing axis, said second biasing member exerting an effective axial force insufficient to compress said compliance zone; and said second adjustment member is operably coupled with said first adjustment member wherein said first adjustment member is relatively moveable toward said rack bearing in continuously-variable axial movements and axial movement of said first adjustment member away from said rack bearing is inhibited; and
a threaded member relatively moveably securing said bearing member to said first adjustment member wherein installation of said threaded fastener defines an axial magnitude of said compliance zone.

8. The rack and pinion steering gear assembly of claim 7 wherein said first adjustment member and said second adjustment member respectively define mutually engaged first and second helical camming surfaces, movement of said second adjustment member relative to said gross adjustment member in said first rotational direction urging said first adjustment member toward said rack bearing through relative movement of said first and second camming surfaces.

9. The rack and pinion steering gear assembly of claim 8 wherein each of said first and second camming surfaces extend through a rotational angle of no more than 360 degrees.

10. A rack and pinion steering gear assembly, said assembly comprising:

a pinion shaft;
a rack operably engaged with said pinion shaft;
a housing forming a housing interior, said pinion shaft and said rack being at least partially disposed within said housing interior;
a rack bearing, said rack bearing engaged with said rack and disposed opposite said pinion shaft;
a biasing assembly operably coupled with said rack bearing and biasing said rack bearing into engagement with said rack along a biasing axis whereby said rack bearing urges said rack into engagement with said pinion shaft; and wherein said biasing assembly comprises:
a gross adjustment member securable to said housing at a plurality of axial positions relative to said biasing axis, said gross adjustment member being fixed to said housing at a selected one of said positions during initial assembly of said steering gear assembly;
a bearing assembly, said bearing assembly including a bearing member, a first adjustment member and an O-ring; said bearing member being bearingly coupled with said rack bearing, said first adjustment member being relatively moveably coupled with said bearing member wherein relative movement along said biasing axis between said first adjustment member and said bearing member defines a compliance zone; said compliance zone allowing said bearing member to move in response to dimensional variations in said pinion shaft and said rack during operation of said steering gear assembly; said O-ring biasing said bearing member along said biasing axis away from said first adjustment member and toward said rack bearing; and
an accumulative adjustment assembly operably disposed between said gross adjustment member and said first adjustment member and disposed entirely within said housing interior; said accumulative adjustment assembly having a first biasing member wherein said first biasing member is operably coupled with said first adjustment member and urges said first adjustment member toward said rack bearing along said biasing axis, said first biasing member exerting an effective axial force insufficient to compress said compliance zone; and wherein said first adjustment member is operably coupled with said biasing assembly wherein said first adjustment member is relatively moveable toward said rack bearing in continuously-variable axial movements and axial movement of said first adjustment member away from said rack bearing is inhibited.

11. The rack and pinion steering gear assembly of claim 10, wherein said first adjustment member has first and second camming surfaces.

12. The rack and pinion steering gear assembly of claim 11, wherein said first and second camming surfaces define helically oriented surfaces and said second biasing member urges rotation of at least one of said first and second camming surfaces about said biasing axis.

13. The rack and pinion steering gear assembly of claim 12, wherein said first and second camming surfaces comprise first and second sets of mating helical threads, each of said first and second sets of helical threads extending through a rotational angle greater than 360 degrees.

* * * * *